(12) United States Patent
Eberhard et al.

(10) Patent No.: US 6,442,655 B1
(45) Date of Patent: Aug. 27, 2002

(54) SYSTEM AND METHOD FOR HANDLING STORAGE CONSISTENCY CONFLICT

(75) Inventors: Raymond J. Eberhard, Endicott; Eddie Wong; Vincent P. Zeyak, Jr., both of Apalachin, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/699,957

(22) Filed: Oct. 30, 2000

Related U.S. Application Data

(62) Division of application No. 09/144,763, filed on Aug. 31, 1998, now Pat. No. 6,237,067.

(51) Int. Cl.$^7$ .......................... G06F 12/00; G06F 13/00
(52) U.S. Cl. .......................... 711/151; 711/150; 710/3; 710/52
(58) Field of Search .......................... 710/3, 5, 52, 118, 710/140, 143, 150, 151, 158, 154

(56) References Cited

U.S. PATENT DOCUMENTS

| | | | |
|---|---|---|---|
| 4,661,900 A | * 4/1987 | Chen et al. | 712/4 |
| 4,901,230 A | * 2/1990 | Chen et al. | 711/149 |
| 4,914,569 A | 4/1990 | Levine et al. | 364/200 |
| 5,125,083 A | 6/1992 | Fite et al. | 395/375 |
| 5,170,370 A | * 12/1992 | Lee et al. | 708/520 |
| 5,265,231 A | 11/1993 | Nuwayser | 395/425 |
| 5,377,345 A | 12/1994 | Chang et al. | 395/425 |
| 5,432,918 A | 7/1995 | Stamm | 395/425 |
| 5,465,336 A | 11/1995 | Imai et al. | 395/375 |
| 5,546,546 A | 8/1996 | Bell et al. | 395/292 |
| 5,596,740 A | * 1/1997 | Quattromani et al. | 711/157 |
| 5,634,073 A | 5/1997 | Collins | 710/5 |
| 5,649,157 A | 7/1997 | Williams | 395/478 |
| 5,682,537 A | 10/1997 | Davies et al. | 395/726 |
| 5,687,348 A | 11/1997 | Whittaker | 395/460 |
| 5,848,286 A | * 12/1998 | Schiffleger et al. | 712/4 |
| 5,938,739 A | 8/1999 | Collins | 710/5 |
| 6,049,847 A | 4/2000 | Vogt | 710/130 |
| 6,098,162 A | * 8/2000 | Schiffleger et al. | 712/4 |

FOREIGN PATENT DOCUMENTS

| | | | |
|---|---|---|---|
| EP | 418447 A1 | 3/1991 | G06F/5/06 |
| EP | 0415161 A2 | 4/1996 | H04Q/11/04 |
| FR | 2728364 | 6/1996 | |
| JP | 59-36462 | 2/1984 | H04L/13/00 |
| JP | 3202922 | 9/1991 | G06F/9/46 |
| JP | 5035511 | 2/1993 | G06F/9/46 |
| WO | 97/34395 | 9/1997 | H04L/12/56 |

OTHER PUBLICATIONS

Garcia, A. Tagged Inter Processor Communication Bus for Multiprocessor Systems, IBM Technical Disclosure Bulletin, No. 3 08–91, p. 115–121.
Sawyer, T. H. Intermachine Communication Architecture, IBM Technical Disclosure Bulletin, 12–80 p. 3366–3368.

* cited by examiner

*Primary Examiner*—Tuan V. Thai
(74) *Attorney, Agent, or Firm*—Shelley M Beckstrand

(57) ABSTRACT

A memory coherency controller. Responsive to a request including a request type and request memory address, relevant queues are examined for queued addresses matching the request memory address. Responsive to a request memory address matching at least one of the queued addresses, the request is rejected. Following a retry latency, the request is retried. When the address of a read request matches queued address in a store queue, at least one request in the store queue is prioritized higher than all other queued requests.

18 Claims, 7 Drawing Sheets

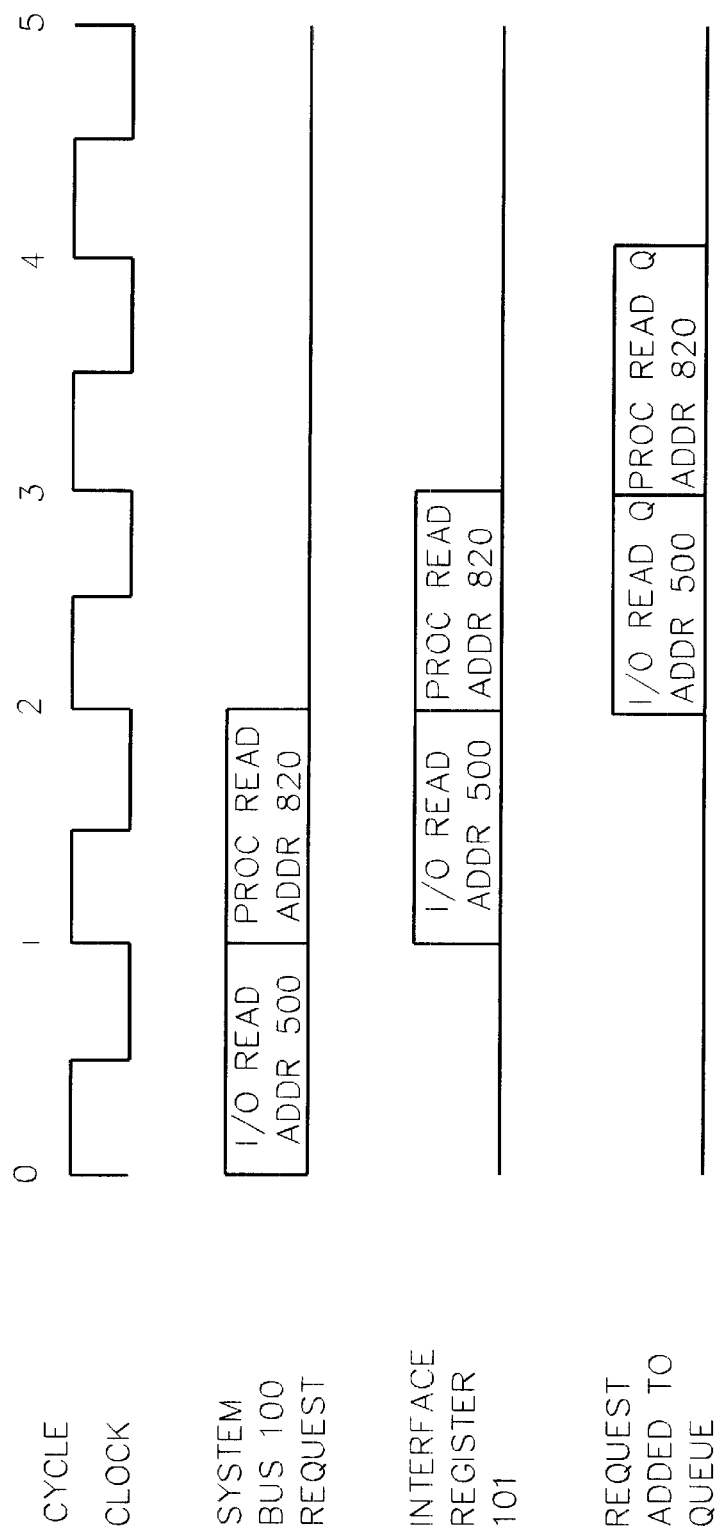

| | | ADDR 500 COMPARED TO 500, 600 AND 7050 | ADDR 820 COMPARED TO 500, 600 AND 7050 |
|---|---|---|---|

REQUEST'S ADDRESS COMPARED TO PREVIOUSLY QUEUED ADDRESSES

| | ADDR HIT | ADDR MISS |
|---|---|---|

I/O QUEUE HIT/MISS 123

| | | REJECT I/O READ 500 | ACCEPT PROC READ 820 |
|---|---|---|---|

SYSTEM BUS REQUEST REJECT/ACCEPT 117

| PRIORITIZE PROCESSOR READ QUEUE REQUEST ADDRESS 300 | PRIORITIZE I/O READ QUEUE REQUEST ADDRESS 9060 | PRIORITIZE STORE QUEUE REQUEST—STORE TO ADDRESS 500 | PRIORITIZE PROCESSOR READ QUEUE REQUEST ADDRESS 2000 | PRIORITIZE I/O READ QUEUE REQUEST ADDRESS 5020 |
|---|---|---|---|---|

MEMORY INTERFACE 111

FIG. 3C

SYSTEM AND METHOD FOR HANDLING STORAGE CONSISTENCY CONFLICT

CROSS REFERENCE TO RELATED APPLICATION

This application is a divisional of U.S. patent application Ser. No. 09/144,763 filed Aug. 31, 1998 now U.S. Pat. No. 6,237,067 by R. J. Eberhard, et al. for System and Method for Handling Storage Consistency Conflict.

BACKGROUND OF THE INVENTION

1. Technical Field of the Invention

This invention pertains to memory coherency control. More particularly, it relates to a memory coherency control circuit utilizing a plurality of FIFO queues and a priority selection mechanism for avoiding deadlocks and assuring memory coherency.

2. Background Art

Memory controllers which maintain multiple queues to capture storage requests from processors and input/output (I/O) devices are required to enforce memory coherence rules which govern the order in which these requests access storage. The combinatorial logic designed to enforce these rules is complex and requires a considerable amount of circuitry to implement. Also, because of the complex nature of the design required to enforce these rules, the implementation is prone to errors, requiring additional hardware releases and inflating development costs.

Memory controller designs which include multiple queues to enforce storage coherency also can experience deadlock problems. Deadlocks can occur when two requests compete for the same resource, preventing further progress.

It is an object of the invention to provide an improved coherency control mechanism.

It is a further object of the invention to provide an improved coherency control mechanism which avoids deadlock conditions.

It is an object of the invention to reduce circuit complexity and the likelihood of design implementation error in a coherency control mechanism.

SUMMARY OF THE INVENTION

In accordance with the invention, memory coherency is controlled. Responsive to a request including a request type and request memory address, relevant queues are examined for queued addresses matching the request memory address. Responsive to a request memory address, matching at least one of the queued addresses, the request is rejected. Following a retry latency, the request is retried.

In accordance with a further aspect of the invention, when the address of a read request matches queued address in a store queue, at least one request in the store queue is prioritized higher than all other queued requests.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
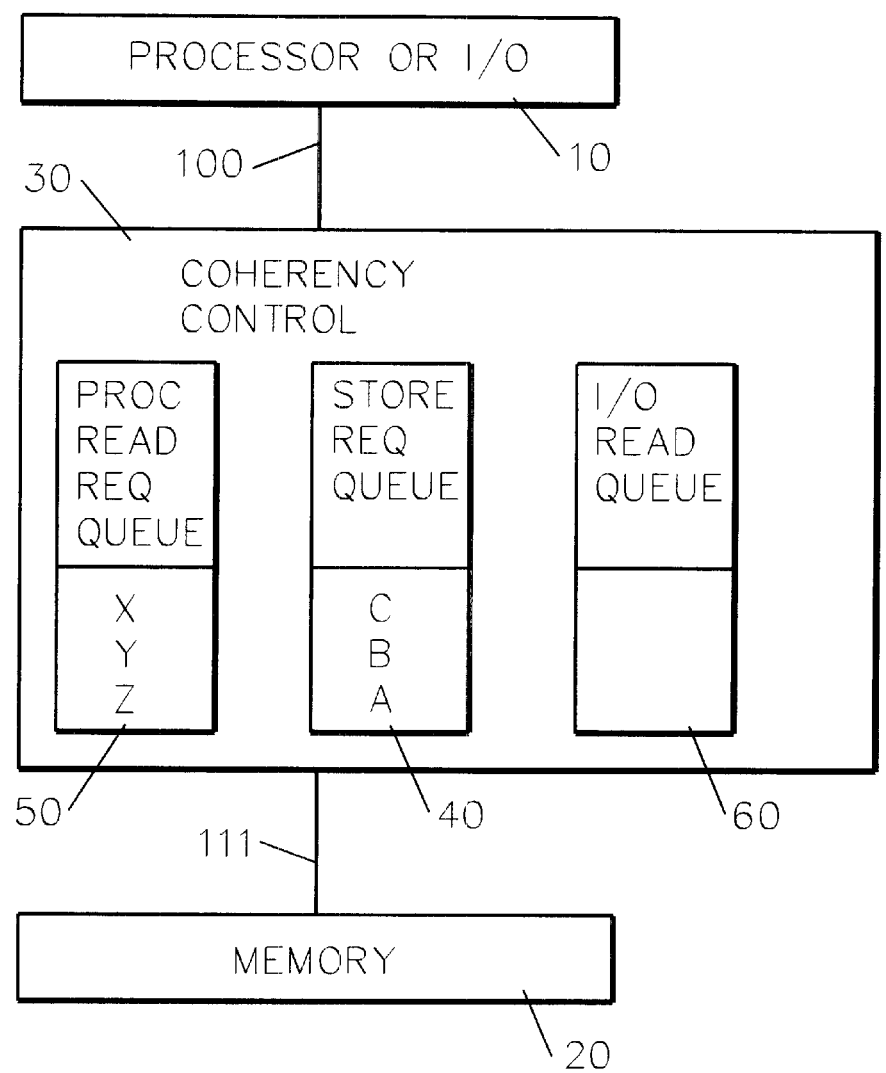
FIG. 1 is a high level system diagram illustrating operation of the coherency control apparatus of the invention.

Referring to FIG. 1, coherency control mechanism 30 is implemented within a memory controller chip which interfaces read and write requests from processor or I/O 10 over system bus 100 with respect to memory 20 over memory interface 111. Coherency control 30 includes processor read request FIFO queue 50 and store request FIFO queue 40. As illustrated in FIG. 1, queue 40 has been loaded with store requests to memory 20 locations A, B and C; and queue 50 has. been loaded with read requests from memory 20 locations Z, Y, and X. (An I/O queue 60 is also shown, and such a queue will be described hereafter in connection with queue 104, FIG. 2B.)

Figure 2:
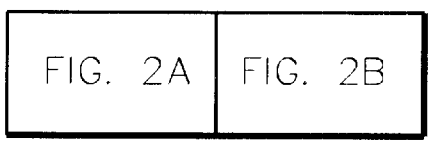
FIGS. 2A and 2B, arranged as represented in FIG. 2, are a more detailed system diagram illustrating the coherency control circuit of the invention.

In operation, in accordance with the preferred embodiment of the present invention, coherency control mechanism 30 receives requests from system bus 100, inspects the type and address information of each request, and compares this information with that for entries already received in specific queues 40, 50. As will be more fully described hereafter in connection with FIG. 2, the queues chosen for comparison are selected based upon the request type and the rules for managing storage coherency. If the address information of the received request, which is significant to coherency management, successfully compares to the same portion of an address (Z,Y,X,A,B, or C) stored in a queue 40 or 50 chosen for inspection by coherency control circuitry 30, then the received request is rejected by coherency control mechanism 30. This received request is then retried on system bus 100. Retrying the request on the system bus 100 provides an opportunity for the requests held in queue 40 or 50 to advance The request, following a retry latency, is reissued by the requesting device 10 and is again received and compared to the appropriate queues 40, 50 selected by coherency control circuitry 30. If the request previously held in queue has not yet been serviced and retired, i.e. removed from the queue, the incoming request is again rejected and retried on the system bus by the coherency control mechanism, allowing queues 40, 50 to advance further. The retry of the same incoming requests continues in this fashion until the previously queued request, or requests, which cause the coherency conflict, are serviced and retired from queue 40 or 50.

Coupled with the coherency control mechanism is circuitry to alter the priority of store requests held in queue 40. If the address of an incoming read request successfully compares to a previously queued store queue 40 entry A, B or C (pending store conflict), like other requests, the read request is retried on system bus 100. However, for this case, the control circuitry used to service and retire queue requests is designed to prioritize store queue 40 requests A, B, C higher than all other queued storage requests Z, Y, X. This action ensures forward progress (through queue 40) so storage deadlocks can be avoided.

Coherency rules implemented by the preferred embodiment of the invention assure (1) that the order of update (that is, store) requests relative to subsequent read requests is preserved; and (2) that the contents of a storage address as it appeared at the time of receipt of a read request are returned to the requester (processor), and not reflect subsequent updates to the same address.

In accordance with the first coherency rule, read requests are compared to store request queue 40 to identify a coherency conflict, and upon noting conflict, rejecting the request and in so doing take advantage of the ability to continue to honor queue requests (driving to memory) and, hopefully, allowing the conflicting storage request to move to storage 20 thereby enabling the request to read from storage to be honored. If coherency conflicts occur in subsequent requests, these are again rejected.

In accordance with the second coherency rule, anything queued in read queue 50 has been previously received (say, three addresses x, y and z) from processor 10 on system bus 100. This second rule dictates that the contents of storage 20 address y should be read and returned to processor 10 as it appeared at the time the read request was received, and not reflect subsequent updates to the same address y. If such a coherency conflict occurs, at least one store is eliminated from the queue to assure forward progress and avoid deadlock.

For all request types, except those resulting in a pending store conflict, queue entries are serviced and retired in a manner that is independent of the action which updates a queue with a new request. The order in which physically distinct queues are serviced is independent of the coherency rules. The only request ordering which must be maintained is the order a particular queue is updated with requests (FIFO). This greatly reduces the complexity of the coherency controls by eliminating the need for tracking the relationship between, and progress of, requests held in separate queues. Also, the independence of incoming versus outgoing queue requests favors a queue's ability to drain, making it less likely for a coherency conflict to exist.

Figure 2A:
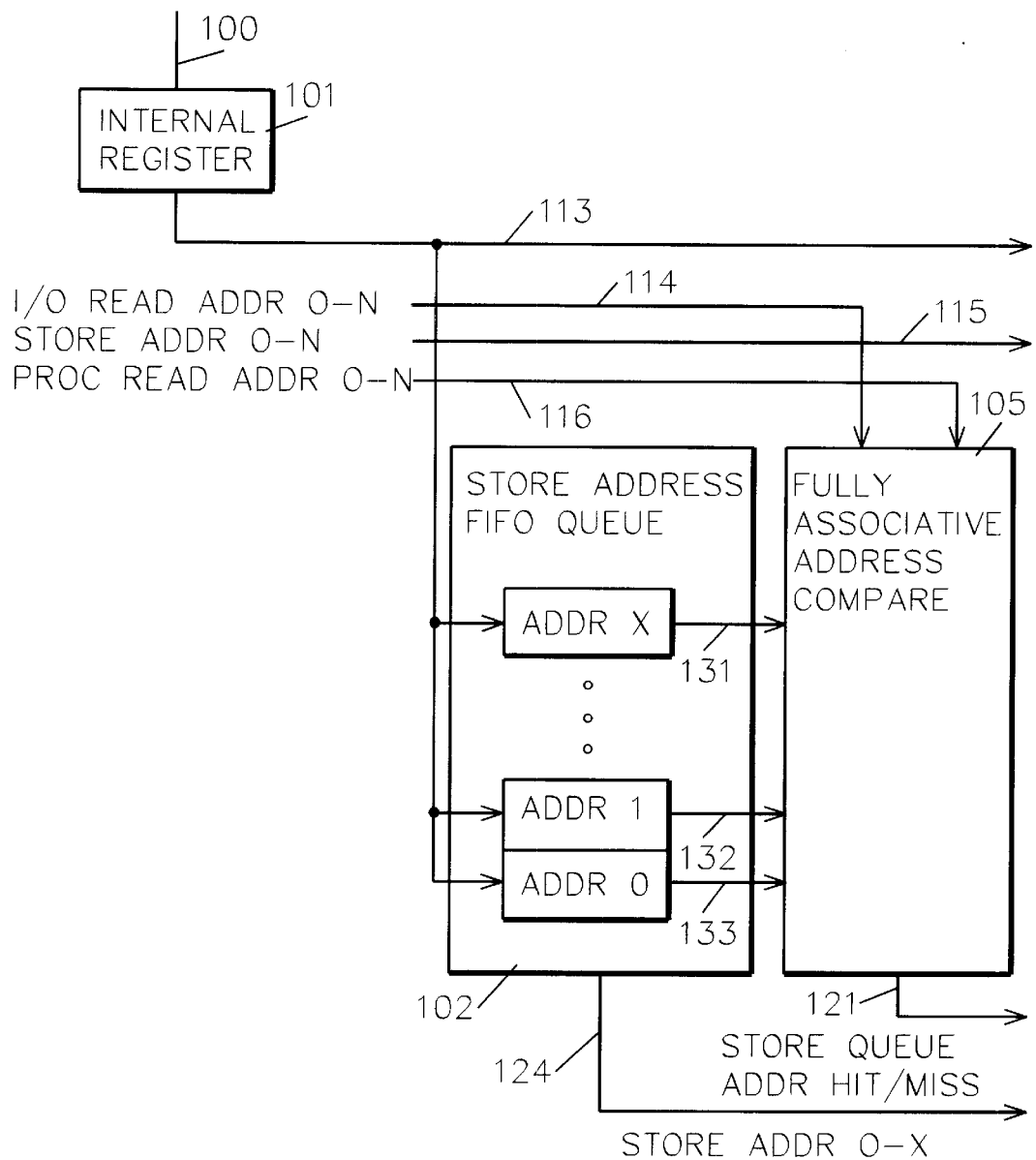
Figure 2B:
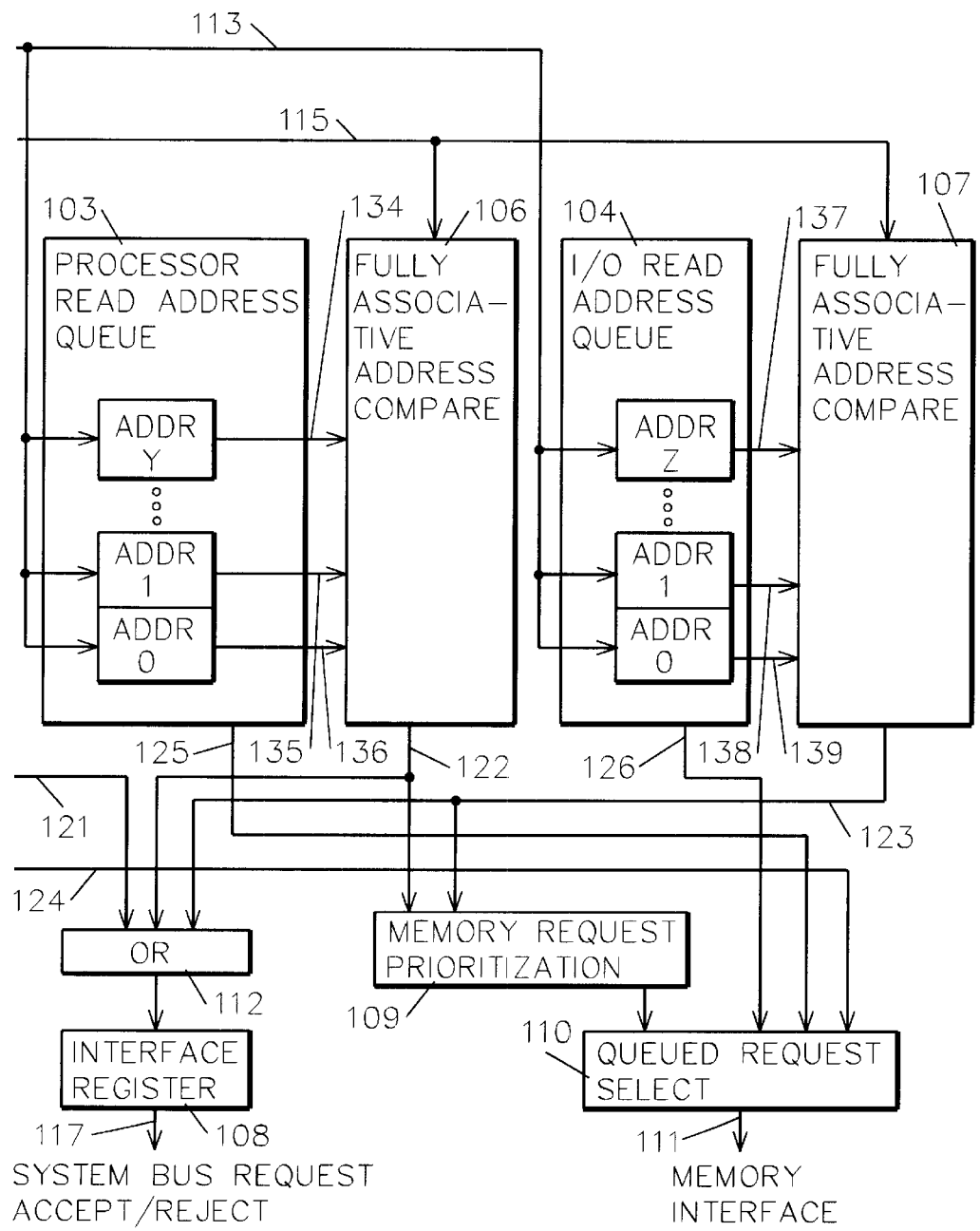

Referring to FIGS. 2A and 2B, in accordance with the preferred embodiment of the invention, coherency control mechanism 30 includes internal register 101, store address FIFO queue 102, processor read address FIFO queue 103, I/O read address FIFO queue 104, fully associative address compare circuits 105–107, logical OR 112, interface register 108, memory request prioritization circuit 109 and queued request select circuit 110.

System bus 100 is fed to internal register 101, the output of which is fed on bus 113 to queues 102–104. Control lines 114–116 selectively gate the output of address bus 113 to queues 102–104. I/O read address 0–N line 114 is fed to address compare circuit 105, store address 0–N line 115 is fed to address compare circuits 106 and 107, and processor read address 0–N line 116 is fed to address compare circuit 105. Queued addresses 0, 1, . . . ,X are fed on lines 131–133 to address compare 105; queued addresses 0,1, . . . ,Y are fed on lines 134–136 to address compare 106; and queued addresses 0,1, . . . ,Z are fed on lines 137–139 to address compare 107.

The output of queue 102 is fed on store address 0–X line 124 to queued request select circuit 110. The output of queue 103 is fed on processor read address 0–Y line 125 to queued request select circuit 110. The output of queue 104 is fed on I/O read address 0–Z line 126 to queued request select circuit 110.

The output of address compare 105 is fed on store queue address hit/miss line 121 to logical OR 112. The output of address compare 106 is fed on processor read queue address hit/miss line 122 to logical OR 112 and memory request prioritization 109. The output of address compare 107 is fed on I/O read queue address hit/miss line 123 to logical OR 112 and memory request prioritization 109. The output of logical OR 112 is fed to interface register 108 and thence to system bus request accept/reject line 117. The output of memory request prioritization 109 is fed to queued request select 110, the output of which is fed to memory interface 111.

Referring further to FIGS. 2A and 2B, in operation, a storage access request is received from a unit capable of sourcing a storage request, i.e. a processing unit 10 on System Bus 100, is latched in Interface Register 101. A request received in Interface Register 101 is forwarded to the appropriate queue, i.e. 102, 103, or 104, determined by the request type. Requests of type "Processor Read" are sent to Processor Read Queue 103, "I/O Read" requests are sent to I/O Read Queue 104, and store requests, either I/O or Processor which are directed to main memory, are sent to Store Queue 102. If all queue entries in the target queue are in use, the request is rejected until a request is retired, making a queue entry available. When a request is latched in its target queue, the request's address is compared to addresses stored in other queues which may comprise entries which may conflict with the address just latched. Address bits which define a coherency block address are compared in fully associative address compare circuits 105–107, and if a match is found, a rejection (hit) signal is latched from compare output lines 121, 122 and/or 123 in System Bus Interface Register 108 which is driven to System Bus 100. If no addresses match, an accept (miss) signal is latched in register 108 and driven on to System Bus 100.

Addresses belonging to read requests which successfully compare to the coherency block address of an entry stored in Store Queue 102 are rejected via the aforementioned mechanism. When such requests are rejected, Memory Request Prioritization logic 109 selects a store request from Store Queue 102 via queued request select circuit 110 as the next request to be delivered to Memory Interface 111. This ensures forward progress such that deadlock is avoided.

When no read store conflict exists, and if one or both read queues 103, 104 contain requests not yet retired, requests are selected and retired from these queues in a manner that provides fairness, i.e., the queues 103, 104 are accessed in a round-robin fashion. Read requests are selected and retired by a particular queue via Memory Request Prioritization 109 and Queued Request Select 110. Once selected, a read request is driven to Memory Interface 111.

When all read requests have been retired, Memory Request Prioritization 109 selects requests from Store Queue 102, if any exist, and delivers these to Memory Interface 111 until all store requests are retired, or a new read request is queued.

Figure 3:
FIGS. 3A, 3B, 3C and 3D arranged as represented in FIG. 3, are a timing diagram illustrating the operation of the coherency control circuit of FIG. 2.
Figure 3B:
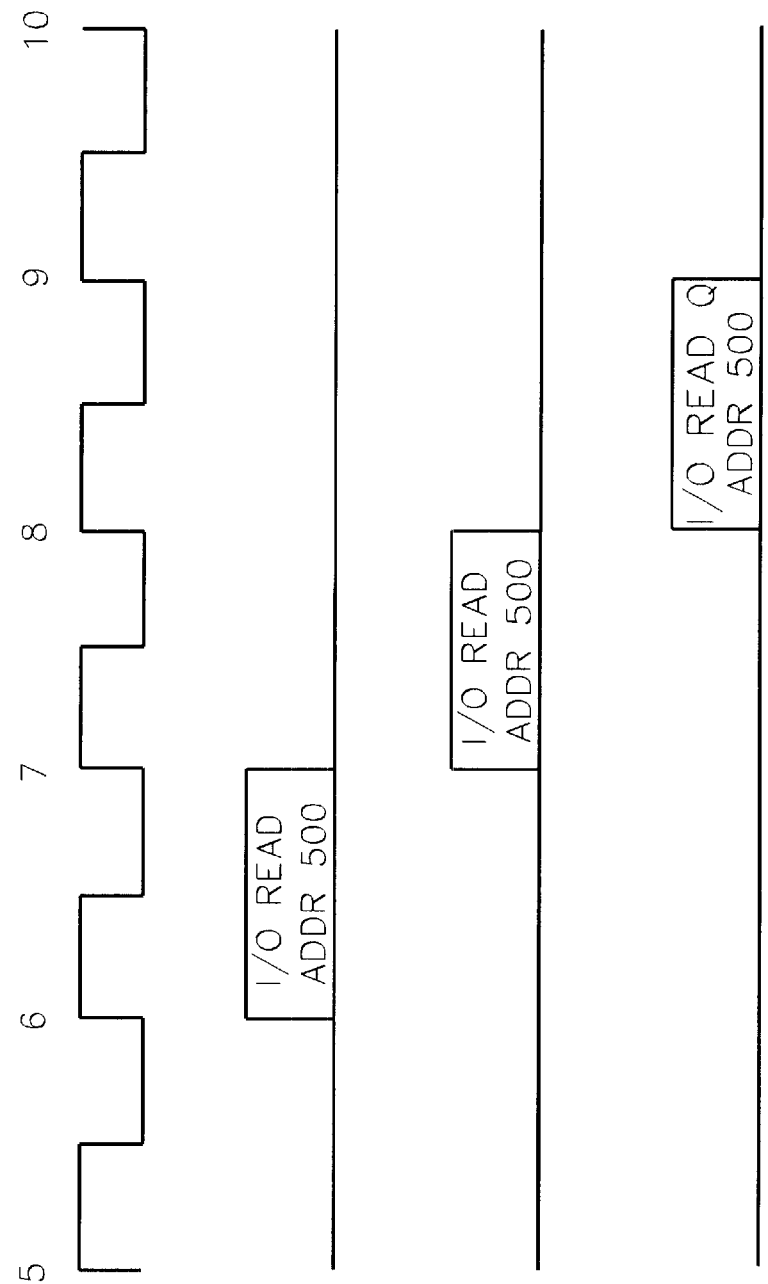
Figure 3D:
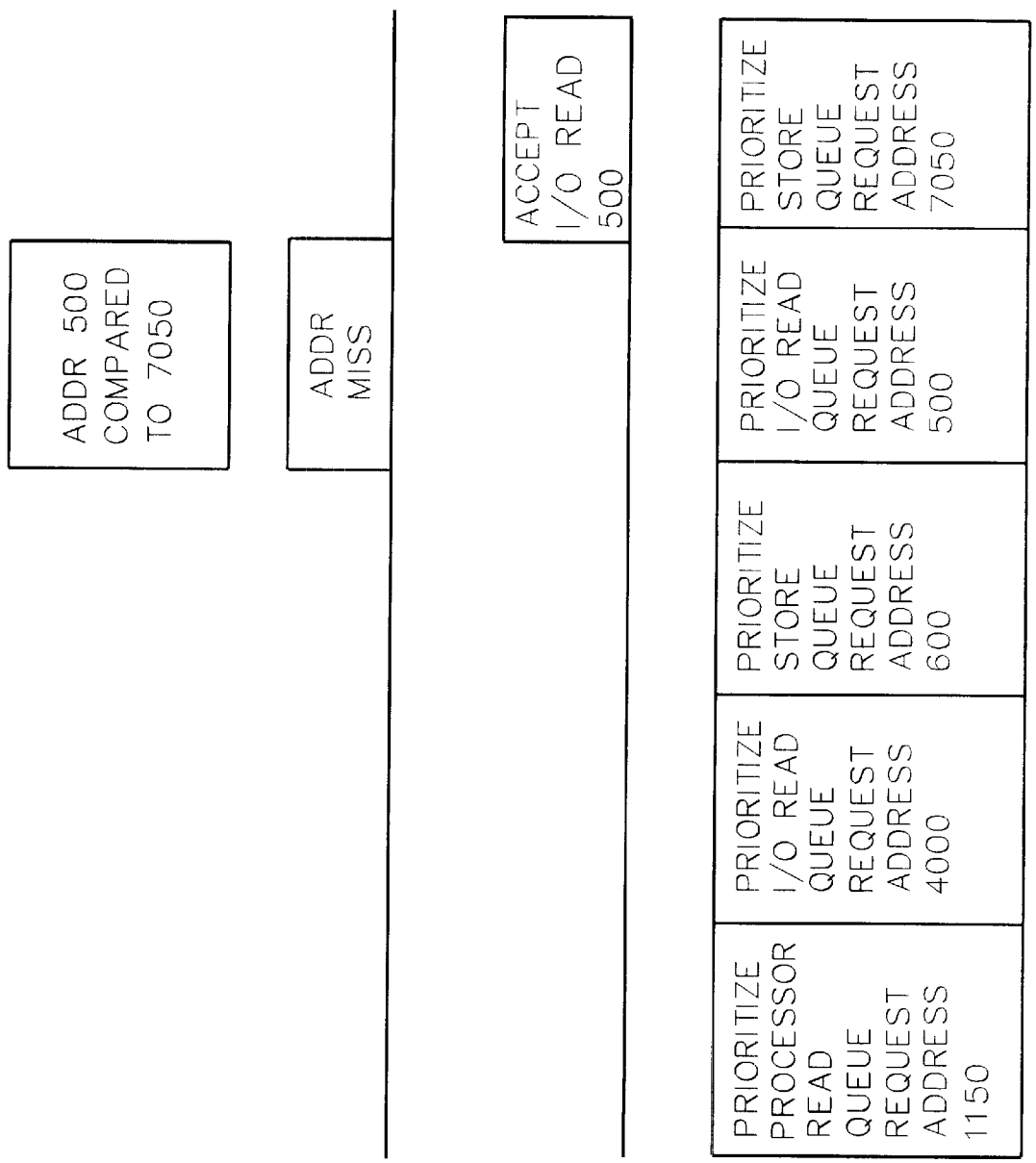

Referring to FIGS. 3A and 3B in connection with FIGS. 2A and 2B, let the initial.queue states be as follows: store queue 102 contains addresses 500, 600 and 7050; processor read queue 103 contains addresses 300, 2000 and 1150; and I/O read queue 104 contains addresses 9060, 5020 and 4000.

In operation, an I/O Read request 114 for address 500 is driven on System Bus 100 at clock cycle 0. Also, Memory Request Prioritization 109 and Queued Request Select 110 select and drive an entry from Processor Read Address Queue 103 to Memory Interface 111.

During cycle I the I/O Read request of cycle 0 is latched in Interface Register 101 and a Processor Read request for address 820 is driven on System Bus 100. Memory Request Prioritization 109 and Queued Request Select 110 select an entry from I/O Read Address Queue 104 to be driven to Memory Interface 111 during this same cycle.

The I/O read request for address 500 is added to I/O Read Address Queue 104 in cycle 2 and the same address is compared to the address of each store request contained within Store Address Queue 102. Coincident with this cycle a Processor Read request for address 820 is latched in Interface Register 101.

The comparison of the I/O Read request's address to addresses in Store Queue 102 in cycle 2 results in a match (hit) on I/O Read Queue Hit/Miss line 123 since I/O Read address 500 successfully compares to store address 500. Successful comparison of a read request's address to a previously queued store address causes a queued store request to be prioritized for delivery to Memory Interface 111 by Memory Request Prioritization 109 and Queued Request select 110. During cycle 3 the I/O Read request to address 500 is rejected when a reject indication is latched in Interface Register 108 and is driven on to System Bus 100. Coincident with this, a Processor Read request to address 820 is queued in Processor Read Address Queue 103. Like the I/O Read request's address, the Processor Read address is compared to addresses contained within Store Address Queue 102. Since Processor Read address 820 does not successfully compare to any Store Address Queue 102 addresses, an accept indication is latched in Interface Register 108 and is driven on to System Bus 100 in cycle 4.

Since both read queues contain requests, Memory Request Prioritization 109 and Queued Request Select 110 alternates its selection of which queued request to drive to Memory Interface 111 during cycles 3 through 6.

During cycle 6 the previously rejected I/O read request to address 500 is driven on System Bus 100 by the device originating the request.

In cycle 7 the I/O read request is latched in Interface Register 101. Since all queued read requests have been retired, Memory Request Prioritization 109 and Queued Request Select 110 selects queued store requests from Store Address Queue 102 to be driven to Memory Interface 111.

The I/O read request latched in Interface Register 101 in cycle 7 is placed in I/O Read Address Queue 104 in cycle 8. Coincident with this, the I/O Read request's address is compared to all store addresses currently contained in Store Address Queue 102. In this same cycle Memory Request Prioritization 109 and Queued Request Select 110 selects the I/O Read request to be driven to Memory Interface 111.

Since in cycle 8 I/O Read address 500 does not successfully compare to any address in Store Address Queue 102, an accept indication is latched in Interface Register 108 and is driven to System Bus 100 in cycle 9. Coincident with cycle 9 the Memory Request Prioritization 109 and Queued Request Select 110 select a store to be driven to Memory Interface 111 from Store Address Queue 102 since all read requests from both read queues have been retired.

Advantages over the Prior Art

It is an advantage of the preferred embodiment of the invention that there is provided an improved coherency control mechanism.

It is a further advantage that there is provided an improved coherency control mechanism which avoids deadlock conditions.

It is a further advantage that there is provided reduced circuit complexity and likelihood of design implementation error in a coherency control mechanism.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. A coherency control method, comprising the steps of:
   storing a first request to a first address in a first queue;
   receiving a second request directed to a second queue including request type and a request memory address;
   receiving a second directed to a second queue including request type a request memory address;
   examining said first queue for a queued address matching said request memory address responsive to said request type;
   rejecting said request responsive to said request memory address matching said first address;
   retrying said second request following a retry latency;
   enabling a compare path to store queues for head requests;
   enabling a compare path to read queues for store requests;
   testing an enabled path for address compare responsive to said second request; and
   rejecting said second request and prioritizing for execution requests in the queue of said enabled path having an address compare responsive to finding an address compare on said enabled path.

2. The method of claim 1, said request being received from a system bus and said rejecting being back to said system bus.

3. The method of claim 1, comprising the further step of continuing to reject requests until queued requests with matching address have been removed from said first queue.

4. The method of claim 3, comprising the further steps of:
   responsive to the address of a read request matching a queued address in a store queue, prioritizing at least one request in said store queue higher than all other queued requests;
   servicing said at least one request; and thereafter
   retrying said read request.

5. The method of claim 1, further comprising the step of:
   upon said rejecting said request, during said retry latency, prioritizing for execution operations pending in said first queue.

6. The method of claim 5, further comprising the steps of:
   following said retry latency, upon retrying said second request, accepting said second request provided said request memory address does not match any said queued address and said second queue is not full.

7. The method of claim 1, said first request being a store request, said first queue being a store queue, and said second request being a read request.

8. The method of claim 1, said first request being a read request, said first queue being a read queue, and said second request being a store request.

9. Coherency control apparatus interfacing a processor to a memory, comprising:
   a first request queue for storing a first request to a first address;
   a second request queue;
   means for receiving a second request from said processor directed to said second request queue, said second request including request type and a second memory address;

means responsive to said request type for examining relevant queues for queued addresses matching said second memory address;

means responsive to said second memory address matching said first address for rejecting said request;

means responsive during a retry latency following rejecting said request for prioritizing for execution operations pending in said first request queue;

means for retrying said request following said retry latency; and means for enabling a compare path to store queues for read requests;

means enabling a compare path to read queues for store requests;

means for testing an enabled path for address compare responsive to said second request; and means for rejecting said second request and prioritizing for execution requests in the queue of said enabled path having an address compare responsive to finding an address compare on said enabled path.

10. The coherency control apparatus of claim 9, further comprising:

means responsive to the address of a read request matching a queued address in said first queue for prioritizing at least one request in said first queue higher than all other queued requests.

11. A coherency control apparatus comprising:

an internal register for storing the request address of a memory request;

a store address queue;

a processor read address queue;

an I/O read address queue;

a first address comparator selectively responsive to an I/O read address request or to a processor read address request for comparing addresses queued in said store address queue with said request address;

a second address comparative to a store request for comparing addresses queued in said processor read address queue with said request address;

a third address comparator responsive to a store request for comparing addresses queued in said I/O read address queue with said request address;

first logic responsive to said address comparators for selectively accepting or rejecting said memory request and responsive during a retry latency following rejecting said memory request for prioritizing operations pending in a queue containing a queue address matching said request address;

following said retry latency, retrying said memory request;

second logic responsive to said memory request for testing an enabled path for address compare; and third logic responsive to finding an addresses compare on said enabled path for rejecting said memory request and for prioritizing of execution requests in the queue of said enabled path having said address compare;

first enabling circuit for enabling a compare path to store queues for read requests; and second enabling circuit for enabling a compare path to read queues for store requests.

12. The coherency control apparatus of claim 11, further comprising:

memory request prioritization logic selectively responsive to said second address comparator or said third address comparator signalling an address hit for prioritizing a store request in said store address queue higher than all other queued requests.

13. The coherency control apparatus claim 11, further comprising:

logic responsive to retrying said memory request for accepting said memory request upon determining that no queue contains a queued address matching said request address and that the queue to which said memory request is directed is not full.

14. A program storage device readable by a machine, tangibly embodying a program of instructions executable by a machine to perform method steps for controlling memory coherency, said method steps comprising:

storing in a first queue a first request directed to a first request address;

receiving a second request directed to a second queue including request type and a second request address;

examining first queue for queued addresses matching said second request address responsive to said request type;

rejecting said request responsive to said request memory address matching said first request address:

prioritizing for execution operations pending in said first queue during a retry latency period following rejecting said request;

retrying said second request following said retry latency;

enabling a compare path to store queues for read requests;

enabling a compare path to read queues for store request;

testing an enabled path for address compare responsive to said second request; and rejecting said second request and prioritizing for execution requests in the queue of said enabled path having an address compare responsive to finding an address compare on said enabled path.

15. An article of manufacture comprising:

a computer readable medium having computer readable program code means embodied therein for controlling memory coherency, the computer readable program code means in said article of manufacture comprising:

computer readable program code means for causing a computer to effect storing as a queued request in a first queue a first request directed to first request memory address;

computer readable program code means for causing a computer to effect receiving a second request directed to a second queue and including request type and a second request memory address;

computer readable program code means for causing a computer to effect, responsive to said request type, examining said first queue for a queued address matching said second request memory address;

computer readable program code means for causing a computer to effect, responsive to said request memory address matching at least one said queued address, rejecting said request, thereafter during a retry latency prioritizing for execution operations pending in said first queue, then following said retry latency, retrying said second request and, provided said request memory address does not match a first request memory address in any said queued request and there exists space in said second queue, accepting said second request;

computer readable program code means for enabling a compare path to store queues for read requests;

computer readable program code means for enabling a compare path to read queues for store requests;

computer readable program code means for testing an enabled path for address compare responsive to said second request; and computer readable program code means for rejecting said second request and prioritizing for execution requests in the queue of said enabled path having an address compare responsive to finding an address compare on said enabled path.

16. Coherency control apparatus interfacing a processor to a memory, comprising:

a first request queue for storing a first request to a first address;

a second request queue;

a register for receiving a second request from said processor directed to said second request queue, said second request including request type and a second address;

a comparator responsive to said request type for examining said first queue for a queued first address matching said second address;

first logic responsive to said second address matching said first address for rejecting said requests;

second logic responsive during a retry latency following rejecting said request for prioritizing for execution operations pending in said first request queue; and thereafter for retrying said request;

first enabling circuit for enabling a compare to store queues for read requests;

second enabling circuit for enabling a compare path to queues for store requests;

third logic responsive to said second request for testing an enabled path for address compare; and fourth logic responsive to finding an address compare on said enabled path for rejecting said second request and for prioritizing of execution requests in the queue of said enabled path having said address compare.

17. The coherency control apparatus of claim 16 wherein said first request queue is a store request queue, said first request is a store request, and said second request is a read request.

18. The coherency control apparatus of claim 16 wherein said first request queue is a read request queue, said first request is a read request, and said second request is a store request.

* * * * *